UNITED STATES PATENT OFFICE.

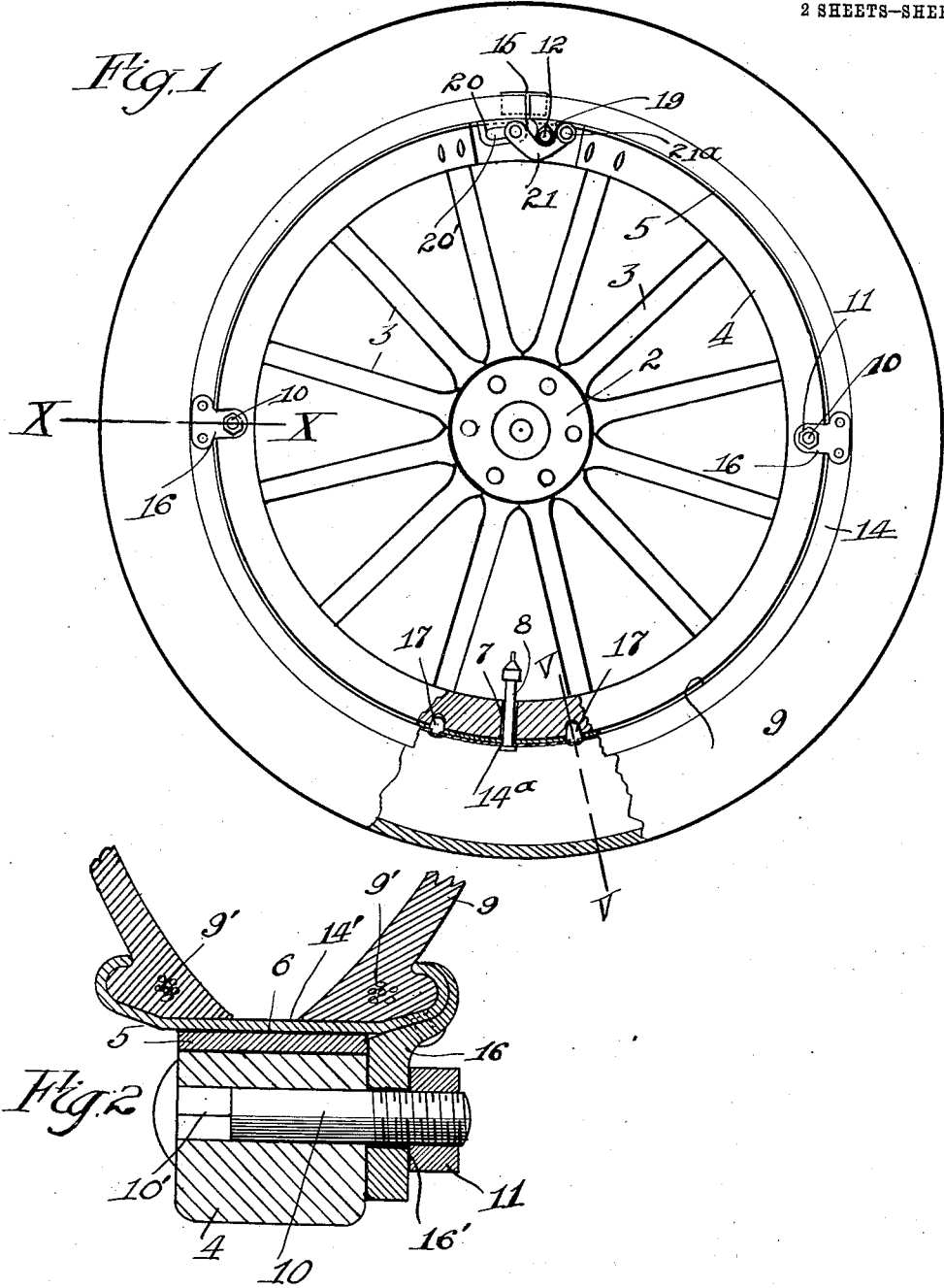

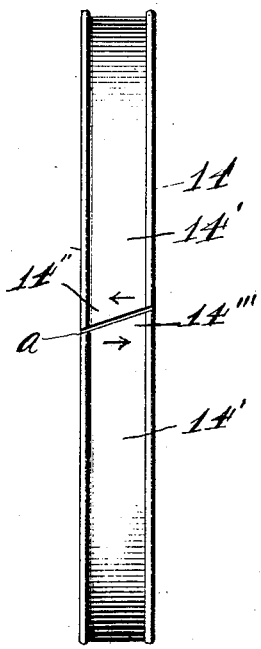
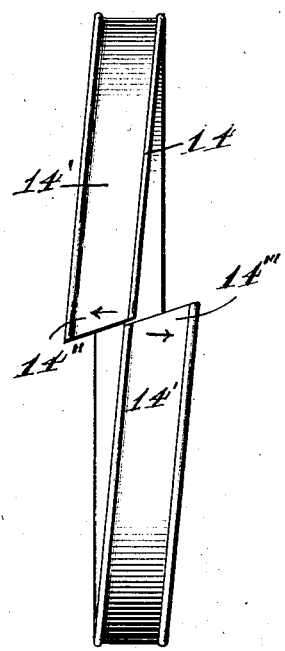
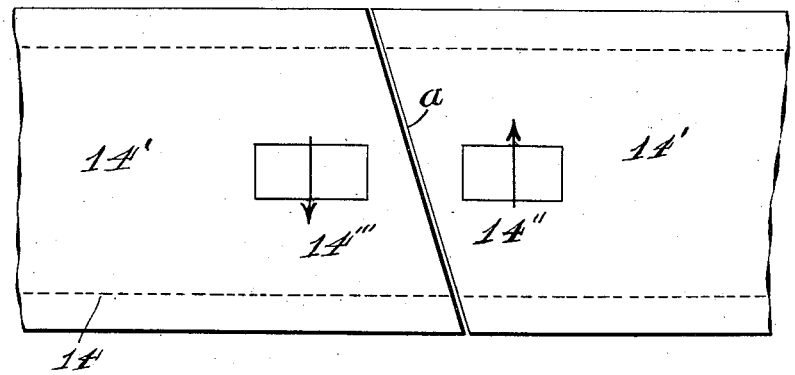

CHARLES GILBERT HAWLEY AND ERLE KING BAKER, OF CHICAGO, ILLINOIS, ASSIGNORS TO UNIVERSAL RIM COMPANY, A CORPORATION OF ILLINOIS.

DEMOUNTABLE RIM.

1,095,996.   Specification of Letters Patent.   Patented May 5, 1914.

Application filed June 14, 1909.   Serial No. 502,069.

*To all whom it may concern:*

Be it known that we, CHARLES GILBERT HAWLEY and ERLE KING BAKER, citizens of the United States, and residents of Chicago, Cook county, Illinois, have invented certain new and useful Improvements in Demountable Rims, of which the following is a full, true, clear, and exact description, such as will enable others skilled in the art to make and use the same.

Our invention relates to improvements in demountable rims for the pneumatic tires of automobile wheels.

The invention herein described and claimed is a modification of that which is described and claimed in our co-pending application Serial No. 501,245, filed June 10th, 1909, entitled Demountable wheel rims.

The object of our invention is to improve the form and construction of integrally flanged and transversely split demountable tire carrying rims for automobile wheels to the end that such rims may be more easily placed in and removed from the pneumatic tires for which they are designed.

Our invention resides in a rim of the next above described kind having a split or opening which conforms to a straight line that extends from a point on one edge of the rim to a circumferentially advanced point on the other edge of the rim whereby the ends of the rim are adapted for easy lateral separation to contract the rim and permit it to be both withdrawn from and placed in the tire without the aid of contracting tools.

The invention will be more readily understood by reference to the accompanying drawings forming a part of this specification, and in which—

Figure 1 is a side elevation of an automobile wheel and tire equipped with a demountable rim embodying our invention; Fig. 2 an enlarged transverse section of the wheel felly rim and tire on the line $x$—$x$ of Fig. 1; Fig. 3 a plan view of the rim dissociated from the tire and wheel; Fig. 4 another view of the rim showing the manner in which the rim is helically distorted as at times of placement in and withdrawal from a tire; and, Fig. 5 an enlarged detail of the ends of the rim showing the diagonal split or cut in the rim.

The device herein shown is known as a demountable rim. Technically considered, it serves as the medium of connection between the pneumatic tire and the wheel. It constitutes in itself a complete preinflated tire carrier. In another sense our rim is incomplete without the wheel, for the reason that certain auxiliary parts are desirably used upon both the rim and the wheel, to adapt them for quick connection and disconnection. As hereinafter described the rim, taken by itself, comprises the rim proper 14 and the several parts which it carries.

Referring now to the particular wheel shown in the drawings, 2 represents the wheel hub; 3 the spokes; 4 the felly; and, 5 the metal felly band. The felly and felly band are shown in cross section in Fig. 2, from which it will be seen that the band is substantially rectangular in cross section, providing the wheel with a flat or cylindrical periphery 6. The rim 14, when in use is firmly seated on this periphery. At one point the felly and felly band contain a hole 7 to receive the valve stem 8 of the pneumatic tire 9. This hole is located centrally or midway in the felly. Driving or anti-creeping studs 17 are placed on opposite sides of the valve stem hole. At several points the wheel is provided with rim fastenings for securing the rim thereto. These fastenings are preferably cross-bolts 10 arranged in the felly.

Our rim 14 as here shown is of ordinary flanged, clencher form in cross section, having a main or middle portion 14' that is flat or cylindrical. This middle portion is adapted to seat firmly on a wheel periphery as shown in Figs. 1 and 2. The exact shape of the flanges of the rim is not material, for our invention admits of the use of rims of various cross sections, having flanges of various kinds and forms, suited to different tires and different uses to which they are to be put. The rim is split or cut transversely at one point (a) and may therefore be opened and closed after the manner of a split ring. We do not use a straight cut across the rim, but make the cut or split at an inclination to the edges thereof, preferably as shown in Figs. 3, 4 and 5. This is done to facilitate the passing of one end of the rim by the other end at times when the rim is to be contracted for insertion in or removal from the base beads of the tire. As shown, 14" and 14''' are the ends of the rim; obviously they may be readily passed or displaced in the directions of the arrows in Figs. 3, 4 and 5. This facilitates the placing of a tire on the rim, also the removal of the rim from a tire. The rim may be easily placed on or removed from the wheel shown when slightly expanded or enlarged in circumference. Likewise it may be firmly bound or secured by contracting it on the wheel. For these purposes we use an operating and locking device of a toggle lever like nature of which 21 is the chief member. The expansion of the rim frees it from the periphery of the wheel and the operator then pulls the rim from the wheel at the point where the operating link 21 is located; i. e. opposite the valve stem; whereupon the rim and tire may be easily lifted or dropped off the wheel, the valve stem withdrawing through the hole in the felly. The placing of an inflated tire on the wheel is accomplished in the reverse manner, the operator first entering the valve stem in the hole in the felly, whereupon the rim will drop down into position with the two locking studs 17 in place in the wheel. The opposite side of the rim may then be pushed into place on the wheel, the lugs 16 serving as stops to limit its swinging movement, also the operating device which is likewise thrust against the felly. When the lugs have been thus positioned against the wheel the operator reversely operates the device 21 to contract and fasten the rim on the wheel after which the bolts are secured in the several lugs. To remove the rim from a tire the locking link is disconnected and one end of the rim is pulled out of line with the other; i. e. the rim is helically distorted, in which condition the rim may be very easily contracted and drawn out from the beads of the tire. The mounting of a tire on the rim is accomplished in much the same way. No effort is made to hold the rim in contracted condition, but generally a pry bar, such as a long screw driver, is used to force the last end of the rim into place.

Our invention is adapted for use with all kinds of tires, but as stated it is especially adapted for non-stretchable pneumatic tires, which because of the small margin of difference in the diameters of the tire and rim, are the most difficult to handle. The tire 9, shown in the drawings is of the non-stretchable kind, as indicated by the cables 9' in the base beads thereof (see Fig. 2). Tires of this kind are but slightly larger than the rims intended to receive them.

As various modifications of our invention will readily suggest themselves to one skilled in the art we do not limit or confine the invention to the specific structure herein shown and described.

The constructions represented and identified by the parts 10, 11, 12, 15, 16, 17, 19, 20, 20' and 21 are not claimed in this application but are described and claimed in our application Serial No. 597,263, filed December 14, 1910, which is a continuation of this application; in the nature of a division hereof.

Having thus described our invention we claim as new and desire to secure by Letters Patent:

1. An integrally flanged demountable tire carrying rim opened at one place by a straight transverse cut extending from a point on one edge of the rim to a circumferentially advanced point on the other edge of the rim, for the purpose specified.

2. An integrally flanged and transversely split demountable tire carrying rim in which the opposed ends substantially conform to a straight line extending from a point on one edge of the rim to a circumferentially advanced point on the other edge thereof, in combination with means for securing said ends together in alinement.

In testimony whereof, we have hereunto set our hands, this 9th day of June, 1909, in the presence of two subscribing witnesses.

CHARLES GILBERT HAWLEY.
ERLE KING BAKER.

Witnesses:
JOHN R. LEFEVRE,
ARTHUR W. NELSON.